US012681789B2

(12) United States Patent
Sforzin et al.

(10) Patent No.: US 12,681,789 B2
(45) Date of Patent: Jul. 14, 2026

(54) DATA STRIPE PROTECTION

(71) Applicant: Micron Technology, Inc., Boise, ID (US)

(72) Inventors: Marco Sforzin, Cernusco Sul Naviglio (IT); Paolo Amato, Treviglio (IT); Daniele Balluchi, Cernusco Sul Naviglio (IT)

(73) Assignee: Micron Technology, Inc., Boise, ID (US)

( * ) Notice: Subject to any disclaimer, the term of this patent is extended or adjusted under 35 U.S.C. 154(b) by 50 days.

(21) Appl. No.: 18/808,341

(22) Filed: Aug. 19, 2024

(65) Prior Publication Data

US 2024/0411451 A1      Dec. 12, 2024

Related U.S. Application Data

(63) Continuation of application No. 17/955,907, filed on Sep. 29, 2022, now Pat. No. 12,067,239.

(60) Provisional application No. 63/295,413, filed on Dec. 30, 2021.

(51) Int. Cl.
| | |
|---|---|
| *G06F 11/00* | (2006.01) |
| *G06F 11/07* | (2006.01) |
| *G06F 11/10* | (2006.01) |

(52) U.S. Cl.
CPC ........ *G06F 11/076* (2013.01); *G06F 11/1004* (2013.01); *G06F 11/1048* (2013.01); *G06F 11/1076* (2013.01)

(58) Field of Classification Search
CPC .............. G06F 11/076; G06F 11/1004; G06F 11/1048; G06F 11/1076; G06F 11/1096
See application file for complete search history.

(56) References Cited

U.S. PATENT DOCUMENTS

| | | | |
|---|---|---|---|
| 8,621,318 B1 | 12/2013 | Micheloni | |
| 9,183,085 B1 | 11/2015 | Northcott | |
| 10,613,934 B2 | 4/2020 | Kalos et al. | |
| 10,884,889 B2 | 1/2021 | Luo et al. | |
| 10,891,192 B1 | 1/2021 | Brennan et al. | |
| 11,409,601 B1 | 8/2022 | Brewer et al. | |
| 12,067,239 B2 * | 8/2024 | Sforzin .............. | G06F 11/1048 |
| 2009/0164836 A1 | 6/2009 | Carmichael | |
| 2013/0179749 A1 | 7/2013 | Tu et al. | |

(Continued)

OTHER PUBLICATIONS

Hafner, J.L. et al., Undetected disk errors in RAID arrays, 2008, IBM (Year: 2008).*

(Continued)

*Primary Examiner* — Marc Duncan
(74) *Attorney, Agent, or Firm* — Brooks, Cameron & Huebsch, PLLC

(57) ABSTRACT

Systems, apparatuses, and methods related to data stripe protection are described. An error management component can process multiple read/write/recovery requests concurrently. When read/write requests are to be processed on respective strips of a stripe, the error management component can process (e.g., concurrently) the read/write requests to determine a quantity of errors within each one of the strips and the determined quantity can be used to further determine whether to access other memory portions to correct the determined quantity.

20 Claims, 6 Drawing Sheets

(56) References Cited

U.S. PATENT DOCUMENTS

2014/0173378 A1* 6/2014 O'Connor .............. H03M 13/11
                                                714/758
2017/0102996 A1    4/2017 Yu
2019/0042379 A1    2/2019 Aklik
2019/0073261 A1    3/2019 Halbert et al.
2022/0237077 A1    7/2022 Brewer
2022/0374307 A1* 11/2022 Shah ................... G06F 11/1048
2022/0382630 A1   12/2022 Amato

OTHER PUBLICATIONS

The write penalty of RAID 5, Aug. 2, 2011, "https://rickardnobel.
se/raid-5-write-penalty/" (Year: 2011).*

* cited by examiner

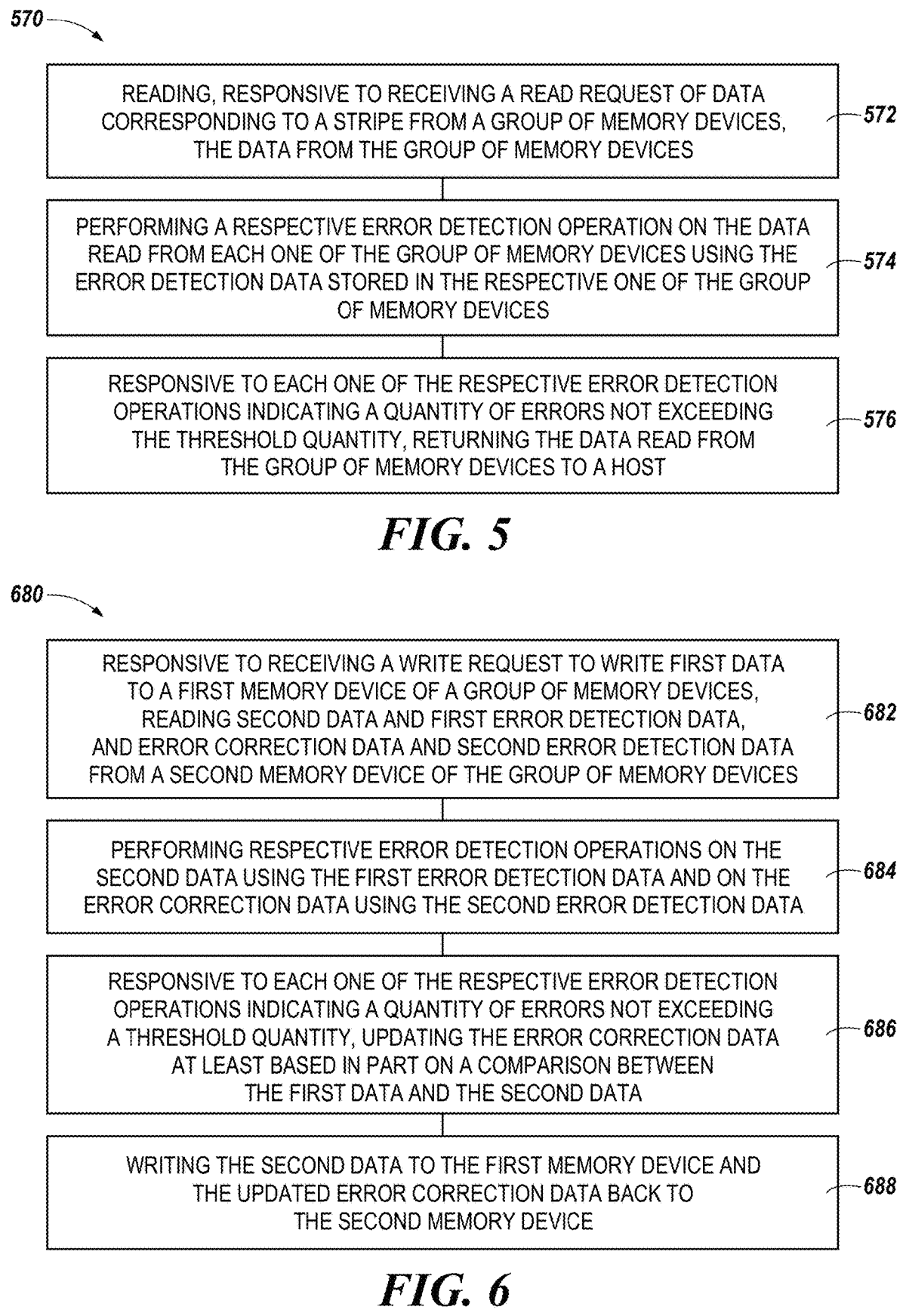

570

| | |
|---|---|
| READING, RESPONSIVE TO RECEIVING A READ REQUEST OF DATA CORRESPONDING TO A STRIPE FROM A GROUP OF MEMORY DEVICES, THE DATA FROM THE GROUP OF MEMORY DEVICES | 572 |
| PERFORMING A RESPECTIVE ERROR DETECTION OPERATION ON THE DATA READ FROM EACH ONE OF THE GROUP OF MEMORY DEVICES USING THE ERROR DETECTION DATA STORED IN THE RESPECTIVE ONE OF THE GROUP OF MEMORY DEVICES | 574 |
| RESPONSIVE TO EACH ONE OF THE RESPECTIVE ERROR DETECTION OPERATIONS INDICATING A QUANTITY OF ERRORS NOT EXCEEDING THE THRESHOLD QUANTITY, RETURNING THE DATA READ FROM THE GROUP OF MEMORY DEVICES TO A HOST | 576 |

| | |
|---|---|
| RESPONSIVE TO RECEIVING A WRITE REQUEST TO WRITE FIRST DATA TO A FIRST MEMORY DEVICE OF A GROUP OF MEMORY DEVICES, READING SECOND DATA AND FIRST ERROR DETECTION DATA, AND ERROR CORRECTION DATA AND SECOND ERROR DETECTION DATA FROM A SECOND MEMORY DEVICE OF THE GROUP OF MEMORY DEVICES | 682 |
| PERFORMING RESPECTIVE ERROR DETECTION OPERATIONS ON THE SECOND DATA USING THE FIRST ERROR DETECTION DATA AND ON THE ERROR CORRECTION DATA USING THE SECOND ERROR DETECTION DATA | 684 |
| RESPONSIVE TO EACH ONE OF THE RESPECTIVE ERROR DETECTION OPERATIONS INDICATING A QUANTITY OF ERRORS NOT EXCEEDING A THRESHOLD QUANTITY, UPDATING THE ERROR CORRECTION DATA AT LEAST BASED IN PART ON A COMPARISON BETWEEN THE FIRST DATA AND THE SECOND DATA | 686 |
| WRITING THE SECOND DATA TO THE FIRST MEMORY DEVICE AND THE UPDATED ERROR CORRECTION DATA BACK TO THE SECOND MEMORY DEVICE | 688 |

FIG. 6

DATA STRIPE PROTECTION

PRIORITY INFORMATION

This application is a continuation of U.S. application Ser. No. 17/955,907, filed on Sep. 29, 2022, which claims the benefit of U.S. Provisional Application No. 63/295,413, filed on Dec. 30, 2021, the contents of which are incorporated herein by reference.

TECHNICAL FIELD

The present disclosure relates generally to semiconductor memory and methods, and more particularly, to apparatuses, systems, and methods for data stripe protection.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, and resistance variable memory such as phase change random access memory (PCRAM), resistive random access memory (ReRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

BRIEF DESCRIPTION OF THE DRAWINGS

FIG. 5 is a flow diagram representing an example method for data stripe protection in accordance with a number of embodiments of the present disclosure.

FIG. 6 is another flow diagram representing another example method for data stripe protection in accordance with a number of embodiments of the present disclosure.

DETAILED DESCRIPTION

Figure 1:
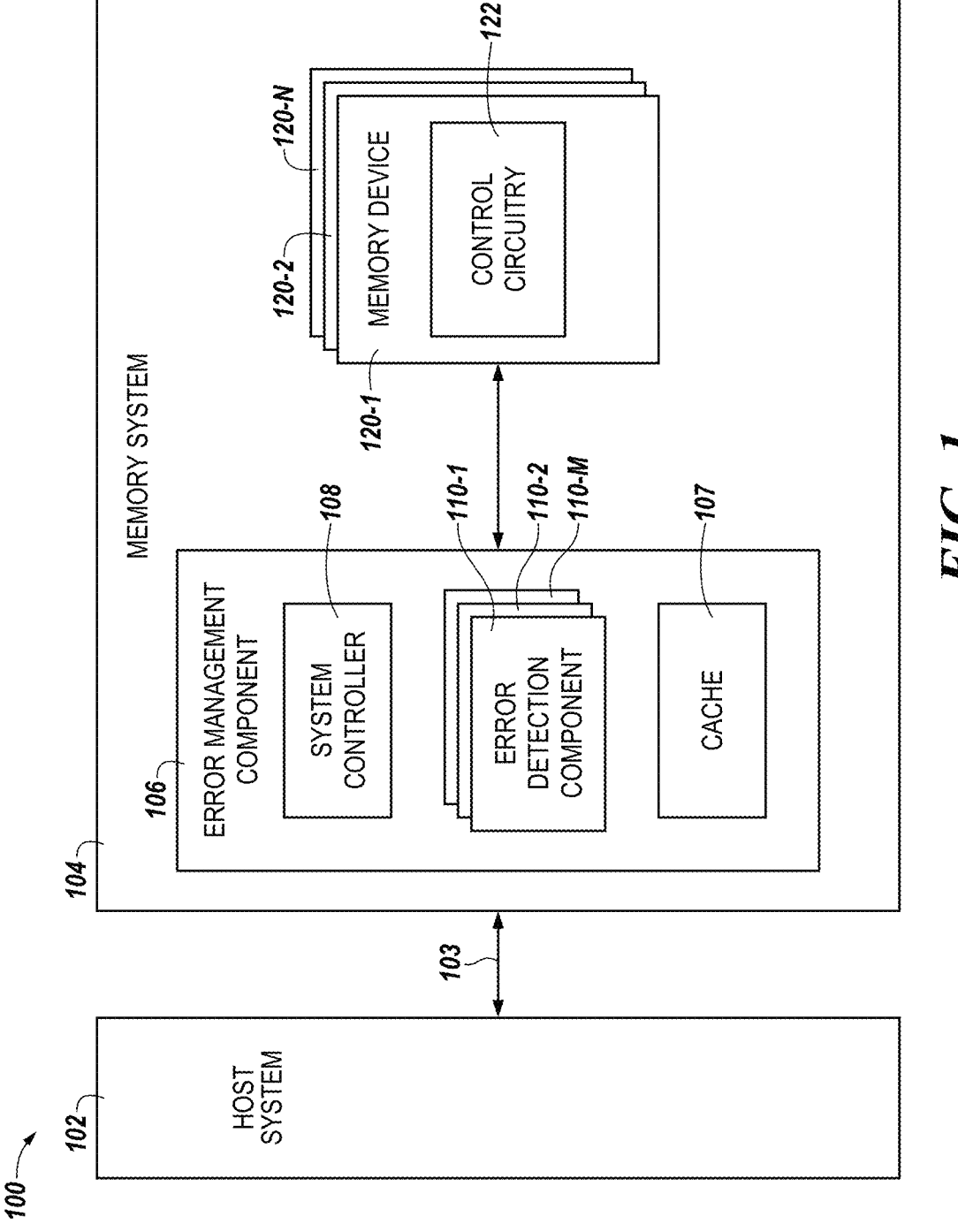
FIG. 1 is a block diagram in the form of a computing system including a host and a memory system in accordance with a number of embodiments of the present disclosure.

Systems, apparatuses, and methods related to data stripe protection are described. Data protection and recovery schemes are often an important aspect of RAS (Reliability, Availability, and Serviceability) associated with memory systems. Such schemes may provide a "chip kill" capability, in which the memory system can work properly even if a constituent chip, such as a memory die, is damaged; thereby, avoiding a situation of one of the chips being a single point of failure (SPOF) of the memory system. Often, the chip kill capability is provided through a "Redundant Array of Independent Disks" (RAID) scheme, which allow data recovery of the damaged chip by reading all of the constituent chips of the memory system.

Such a RAID scheme providing the chip kill capability; however, may incur substantial latencies associated with processing read/write requests of data that are distributed over multiple chips and are still grouped as the same parity stripe. The latencies can be further increased particularly when a complex form of multiple operations (e.g., bank recovery mechanism, such as circular redundancy check (CRC) and/or RAID) are desired to be performed on each constituent strip of the same parity stripe, but read from different chips.

In contrast, embodiments described herein are directed to providing a data stripe protection scheme that can process multiple requests for read/write and/or recovery requests (to detect/correct errors) even on multiple strips of the same parity stripe concurrently. Therefore, the data stripe protection scheme provided by the embodiments of the present disclosure can avoid the latencies that can be incurred from a lack of a capability of processing error correction/detection requests concurrently, which will increase overall performance of a memory system.

In some embodiments, a memory system implemented with a data stripe protection scheme can be a Compute Express Link (CXL) compliant memory system (e.g., the memory system can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (e.g., having the potential to, being able to), not in a mandatory sense (e.g., must). The term "include," and derivations thereof, means "including, but not limited to." The terms "coupled" and "coupling" mean to be directly or indirectly connected physically or for access to and movement (transmission) of commands and/or data, as appropriate to the context.

The figures herein follow a numbering convention in which the first digit or digits correspond to the figure number and the remaining digits identify an element or component in the figure. Similar elements or components between different figures may be identified by the use of similar digits. For example, 108 may reference element "08" in FIG. 1, and a similar element may be referenced as 208 in FIG. 2. A group or plurality of similar elements or components may generally be referred to herein with a single element number. For example, a plurality of reference elements 120-1 to 120-N may be referred to generally as 120. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a block diagram in the form of a computing system 100 including a host 102 and a memory system 104 in accordance with a number of embodiments of the present disclosure. In the embodiment illustrated in FIG. 1, the memory devices 120 can include one or more memory modules (e.g., single in-line memory modules, dual in-line memory modules, etc.). The memory devices 120 can include volatile memory and/or non-volatile memory. In a number of embodiments, the memory devices 120 can each include a multi-chip device. A multi-chip device can include a number of different memory types and/or memory modules. For example, a memory system can include non-volatile or volatile memory on any type of a module. As used herein, an error management component 106, a system controller 108, error detection components 110-1, 110-2, . . ., 110-M, memory devices 120-1, 120-2, . . ., 120-N, and/or control circuitry 122, might also be separately considered an "apparatus."

The computing system 100 can include a host system 102. The host 102 can include host memory and a central processing unit (not illustrated). The host 102 can be a host system such as a personal laptop computer, a desktop computer, a digital camera, a smart phone, a memory card reader, and/or internet-of-thing enabled device, among various other types of hosts, and can include a memory access device, e.g., a processor (or processing device). One of ordinary skill in the art will appreciate that "a processor" can intend one or more processors, such as a parallel processing system, a number of coprocessors, etc.

The host 102 can include a system motherboard and/or backplane and can include a number of processing resources (e.g., one or more processors, microprocessors, or some other type of controlling circuitry). The system 100 can include separate integrated circuits or the host 102, the memory system 104, the error management component 106, and the memory devices 120 can be on the same integrated circuit. The system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

As illustrated in FIG. 1, a host 102 can be coupled to the memory system 104 via an interface 103. The interface 103 can be any type of communication path, bus, or the like that allows for information to be transferred between the host 102 and the memory system 104. Non-limiting examples of interfaces can include a peripheral component interconnect (PCI) interface, a peripheral component interconnect express (PCIe) interface, a serial advanced technology attachment (SATA) interface, and/or a miniature serial advanced technology attachment (mSATA) interface, among others. However, in at least one embodiment, the interface 103 is a PCIe 5.0 interface that is compliant with the compute express link (CXL) protocol standard. Accordingly, in some embodiments, the interface 103 can support transfer speeds of at least 32 gigatransfers per second.

The memory system 104 can include memory device(s) 120, which can provide main memory for the computing system 100 or could be used as additional memory or storage throughout the computing system 100. The memory device 120 can include control circuitry 122 that is configured to perform operations such as copy, write, read, error correct etc. on one or more arrays of memory cells of the memory device 120. Further, in some embodiments, the control circuitry 122 can be configured to correct a quantity of errors not exceeding a threshold quantity (e.g., a single error) on data stored in the respective memory device 120.

The memory devices 120 can be various types of memory devices. For instance, the memory device can include RAM, ROM, DRAM, SDRAM, PCRAM, RRAM, and flash memory, among others. In embodiments in which the memory device 120 includes persistent or non-volatile memory, the memory device 120 can be flash memory devices such as NAND or NOR flash memory devices. Embodiments are not so limited, however, and the memory device 120 can include other non-volatile memory devices such as non-volatile random-access memory devices (e.g., non-volatile RAM (NVRAM), ReRAM, ferroelectric RAM (FeRAM), MRAM, PCRAM), "emerging" memory devices such as a ferroelectric RAM device that includes ferroelectric capacitors that can exhibit hysteresis characteristics, a 3-D Crosspoint (3D XP) memory device, etc., or combinations thereof.

As an example, a FeRAM device can include ferroelectric capacitors and can perform bit storage based on an amount of voltage or charge applied thereto. In such examples, relatively small and relatively large voltages allow the ferroelectric RAM device to exhibit characteristics similar to normal dielectric materials (e.g., dielectric materials that have a relatively high dielectric constant) but at various voltages between such relatively small and large voltages the ferroelectric RAM device can exhibit a polarization reversal that yields non-linear dielectric behavior.

As another example, a 3D XP array of non-volatile memory can perform bit storage based on a change of bulk resistance, in conjunction with a stackable cross-gridded data access array. Additionally, in contrast to many flash-based memories, 3D XP non-volatile memory can perform a write in-place operation, where a non-volatile memory cell can be programmed without the non-volatile memory cell being previously erased.

The memory system 104 can also include an error management component 106, which further includes a system controller 108, error detection components 110, and a cache 107, as illustrated in FIG. 1. The system controller 108 can be a media controller such as a non-volatile memory express (NVMe) controller. For example, the controller 108 can be configured to perform operations such as copy, write, read, error correct, etc. for the memory devices 120.

In addition, the controller 108 can include special purpose circuitry and/or instructions to perform various operations described herein, although not illustrated in FIG. 1. For example, the controller 108 can include circuitry and/or instructions that can be executed to perform various operations associated with an error correction of data, such as generating error correction data that can be utilized to correct a quantity of errors exceeding a threshold quantity (e.g., more than a single error) of data communicated between the host 102 and the memory device 120 and/or performing an error correction operation to correct the quantity of errors. The controller 108 can be operated based on various types of error correction data, such as Hamming codes, Reed-Solomon (RS) codes, Bose-Chaudhuri-Ho-chquenghem (BCH) codes, CRC, Golay codes, Reed-Muller codes, Goppa codes, and Denniston codes, among others.

Data and corresponding error correction data (generated based on the data at the error management component 106) can be written to various locations of the memory devices 120 in a form of a stripe (e.g., parity stripe). As used herein, a stripe can refer to error correction data and a set of data that are used together to generate the error correction data. Accordingly, an error correction operation can be performed in a unit of a stripe. The parity stripe can be distributed over the memory devices 120. As used herein, data stored in each one of the memory devices 120 and corresponding to a particular stripe can be referred to as a "strip" of the particular stripe. Accordingly, a stripe can include multiple strips that are distributed across the memory devices 120 (e.g., a stripe comprises strips from respective memory devices 120).

Error correction data can be stored in the memory devices 120-1, 120-2, . . . , 120-M in various manners. As an example, the error correction data can be stored in a single one of the memory devices 120 such that the memory device configured to store the error correction data is not accessed until a recovery process (e.g., error correction operation to correct a quantity of errors exceeding a threshold quantity) is triggered. In another example, the error correction data can be dispersed into multiple portions that can be distributed among multiple memory devices of the memory devices 120.

Each error detection component 110-1, 110-2, and/or 110-M can be configured to generate error detection data that can be utilized to indicate includes whether data (e.g., host data received from the host 102 and/or error correction data generated at the error management component 106) being communicated between the system controller 108 and the memory device 120 includes a quantity of errors exceeding a threshold quantity and/or perform an error detection operation using the generated error detection data to indicate such. Although embodiments are not so limited, the error detection components 110 can be operated based on CRC data. In this example, the error detection components 110 can include a CRC encoder, which can generate CRC data based on data, and a CRC decoder, which can decode the data using the generated CRC data to detect errors on the data.

The error correction/detection operation performed by the error management component 106 in combination with the error detection components 110 can provide multi-level error correction/detection capability on errors within the memory devices 120. For example, a first level (of the multi-level) of error correction/detection capability can be provided using error correction data stored in one strip to correct a quantity of errors equal to or not exceeding a threshold quantity and using error detection data stored in the same strip for indication of whether there are still errors remaining within the same strip even subsequent to the error correction operation previously performed. If it is indicated that are still errors remaining in the strip, a second level (of the multi-level) of error correction/detection capability can be. The second level of error correction/detection capability can be provided by performing another error correction operation (e.g., second error correction operation) using error correction data stored in at least one of the memory devices 120.

In various embodiments, multiple error correction/detection operations can be performed concurrently using those components of the error management component 106. As an example, multiple error detection operations can be performed concurrently using multiple error detection components 110-1, 110-2, . . . , 110-M. A capability of performing multiple error correction/detection operations concurrently can be provided at a granularity of a single stripe. For example, multiple error correction/detection operations can be performed to concurrently process multiple requests directed to respective multiple strips of a single stripe. Therefore, in the event that multiple error correction/detection operations are desired to be performed on the respective multiple stripes, latencies that would have been incurred from performing the operations in a serial manner (e.g., waiting an on-going operation being performed at one strip to be complete until initiating a subsequent operation to be performed on another strip) can be avoided by performing the operation concurrently.

In some embodiments, the first and the second levels of error correction capabilities can be provided at different processing resources. For example, the first level of error correction capability can be provided (e.g., to correct a single error) at respective control circuitry 122, while the second level of error correction capability can be provided (e.g., to correct errors more than a single error) at the error management component 106.

In some embodiments, host data/error correction data can be accessed from a cache 107 of the error management component 106. Although the cache 107 is illustrated to be located within the error management component 106, embodiments are not limited to a particular location where the cache 107 can be located. For example, the cache 107 can be located and resides external to the component 106 and/or internal to the system controller 108. By accessing at least a portion of the host data/error correction data from the cache 107, latency and/or energy consumption that would have been incurred from accessing the host data/error correction data entirely from the memory devices 120 can be reduced.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the memory device 120. It will be appreciated by those skilled in the art that the number of address input connections can depend on the density and architecture of the memory device 120.

In a non-limiting example, an apparatus can include a group of memory devices (e.g., the memory devices 120 illustrated in FIG. 1). Each one of the group of memory devices can be configured to store error detection data for indication of a quantity of errors exceeding a threshold quantity on data stored in a respective one of the group of memory devices. The apparatus can further include a control component (e.g., the error management component 106 illustrated in FIG. 1) coupled to the group of memory devices can be configured to read, from each one of the group of memory devices, data corresponding to a strip. Each one of the strips read from the group of memory devices is a constituent strip of a single stripe. For indication a quantity of errors exceeding the threshold quantity, a respective error detection operation can be performed on the data read from each one of the group of memory devices using the error detection data stored in the respective one of the group of memory devices. In some embodiments, the control component can be configured to read the data corresponding to the respective strip from each one of the group of memory devices. Further, in some embodiments, the error detection data can include CRC data.

In some embodiments, the control component can be configured to read, from at least one of the group of memory devices, error correction data in response to at least one of the respective error detection operations indicating that a quantity of errors exceeding the threshold quantity. The control component can be further configured to perform an error correction operation on the data using the error correction data. The control component is configured to read the error correction data from a cache (e.g., the cache 107 illustrated in FIG. 1) or at least one of the group of memory devices. In some embodiments, the control component can be configured to return the data corresponding to the stripe and read from the group of memory devices to a host in response to the respective error detection operation performed on the data read from each one of the group of memory devices indicating a quantity of errors not exceeding the threshold quantity.

In another non-limiting example, a system can include a group of memory devices (e.g., the memory devices 120 illustrated in FIG. 1). Each one of the group of memory devices can be configured to store error detection data for indication of a quantity of errors exceeding a threshold quantity on data stored in a respective one of the group of memory devices. A first memory device of the group of memory devices can be configured to store error correction data to correct a quantity of errors exceeding the threshold quantity on the data stored in a respective one of the group of memory devices. The system can further include a control component (e.g., the error management component 106 illustrated in FIG. 1) coupled to the group of memory devices. The control component can be configured to, in response to receipt of a write request to write data to a second memory device of the group of memory devices, read data from the second memory device and the error correction data from the first memory device. The control component can be further configured to perform a respective error detection operation on the data and the error correction data using the respective error detection data stored in the first and the second memory devices. The control component can be further configured to, in response to each one of the respective error detection operations performed on the data and the error correction data indicating a quantity of errors not exceeding the threshold quantity, update the error correction data based on a comparison between the data read from the second memory device and the data corresponding to the write request. The control component can be further configured to write the data corresponding to the write request to the second memory device. In some embodiments, the control component is further configured to read the data stored in the second memory device and the error correction data stored in the first memory device.

In some embodiments, the control component can be configured to, in response to the error detection operation performed on the data indicating a quantity of errors exceeding the threshold quantity, read, from the group of memory devices, other data corresponding to a same stripe as the data stored in the second memory device. The control component can be further configured to perform an error detection operation using respective error detection data on the other data read from the group of memory devices. The control component can be further configured to, in response to the error detection operation performed on the other data indicating a quantity of errors not exceeding the threshold quantity, perform an error correction operation on the data using the error correction data as well as the other data corresponding to the same stripe as the data.

In some embodiments, the control component can be configured to, in response to the error detection operation performed on the data indicating a quantity of errors exceeding the threshold quantity, read, from the group of memory devices, other data corresponding to a same stripe as the data stored in the one of the group of memory devices. The control component can be further configured to perform an error detection operation using respective error detection data on the other data read from the group of memory devices. The control component can be further configured to, in response to the error detection operation performed on the other data indicating a quantity of errors exceeding the threshold quantity, flag the data and the other data to indicate a quantity of errors exceeding the threshold quantity within the data and the other data.

In some embodiments, the control component can be configured to, in response to the error detection operation performed on the error correction data read from the first memory device indicating a quantity of errors exceeding the threshold quantity on the error correction data, read, from the group of memory devices, other data corresponding to a same stripe as the data stored in the one of the group of memory devices. The control component can be further configured to generate error correction data using the data read from the second memory device and the other data. The control component can be further configured to write the generated error correction data to the first memory device.

In some embodiments, the error correction data comprises parity data. In some embodiments, the group of memory devices are coupled to different channels.

Figure 2:
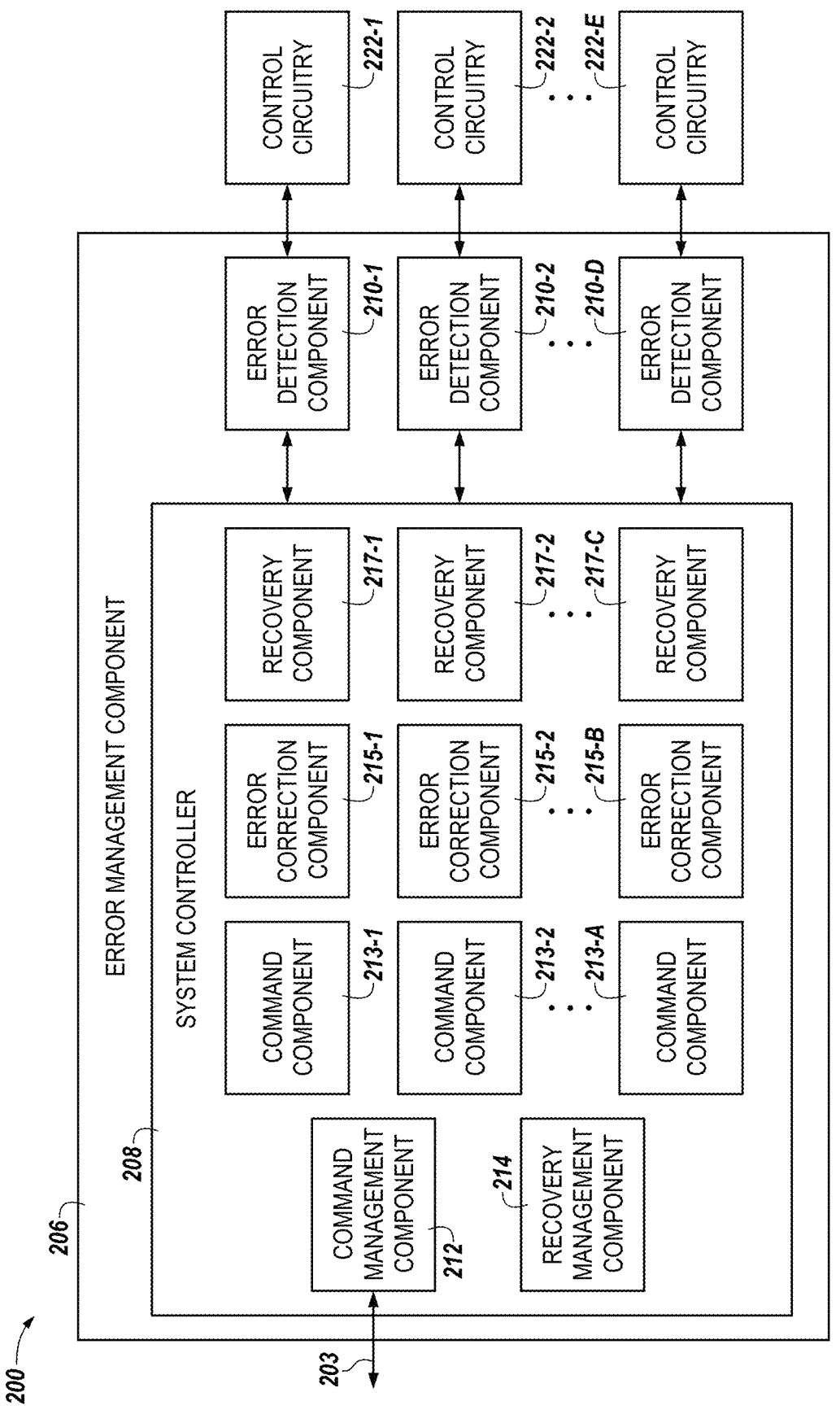
FIG. 2 is a block diagram in the form of a computing system including an error management component and control circuitries in accordance with a number of embodiments of the present disclosure.

FIG. 2 is a block diagram in the form of a computing system 200 including an error management component 206 and control circuitries 222 in accordance with a number of embodiments of the present disclosure. The error management component 206, system controller 208, error detection components 210, and control circuitries 222 can be analogous to the error management component 106, system controller 108, error detection components 110, and control circuitries 122 described in connection with FIG. 1.

The error management component 206 can include a command management 212, a recovery management component 214, command components 213-1, . . . , 213-A, error correction components 215-1, . . . , 215-B, recovery components 217-1, . . . , 217-C, and error detection components 210-1, . . . , 210-D. In some embodiments, each one of command components 213, error correction components 215, the recovery components 217, and the error detection components 210 can include an identifier that can be used to distinctively identify the respective component.

The error management component 206 can utilize the components to concurrently process various types of multiple requests corresponding to multiple strips, such as read/write request as well as requests to perform error correction/detection operations. For example, a request directed to data corresponding to one strip can be concurrently processed using a command component 213-1, an error correction component 215-1, a recovery component 217-1, an error detection component 210-1, and/or control circuitry 222-1, while a request directed to data corresponding to a different strip can be concurrently processed using a command component 213-2, an error correction component 215-2, a recovery component 217-2, an error detection component 210-2, and/or control circuitry 222-2. Although embodiments are not so limited, the command components 213, error correction components 215, recovery components 217, and/or error detection components 210 can be a state machine.

The system controller 208 includes a command management component 212, which can communicate with a host (e.g., host 102 described in connection with FIG. 1) via an interface 203 that is analogous to the interface 103 described in connection with FIG. 1. The command manager 212 can receive read/write requests from the host and further enable/manage command components 213 to communicate data corresponding to the read/write requests between the host and memory devices (e.g., memory devices 120 illustrated in FIG. 1).

The error detection components 210 can assist in communicating data between the system controller 108 and the control circuitries 222 of the memory devices as well as perform an error detection operation (to indicate a quantity of errors exceeding a threshold quantity) on data being communicated between the system controller 108 and the control circuitries 222. A result of the error detection operation performed at the error detection components 210 can be further communicated to the command management component 212 via the command components 213. In some embodiments, the error detection components 210 can further generate error detection data (that can be used to indicate a quantity of errors exceeding the threshold quantity) on data being communicated between the system controller 108 and the control circuitries 222.

The command components 213 can further communicate with error correction components 215 to request error correction components 215 to perform an error correction operation and/or and update error correction data, for example, as part of a write request (as further described in connection with FIG. 4). The error correction components 215 can provide a result of the error correction operation and/or updating of the error correction data back to the respective command components 213.

Each command component 213 can provide, while processing the read/write request, a request for a recovery process to the recovery management component 214 in response to the error detection components 210 indicating a quantity of errors exceeding a threshold quantity. Upon receiving the request from at least one of the command components 213, the recovery management component 214 can suspend the command components 213 and further request at least one of the recovery components 217 to initiate/perform the recovery process.

Each recovery component 217 can communicate with the respective control circuitry 222 via one of the error detection components 210 to read data and/or write data. For example, to perform an error correction operation using error correction components 215, the recovery component 217 can provide a read request (to read data and corresponding error correction data) to the respective error detection component 210, which further route the read request to the respective control circuitry 222, which can return the requested data back to the recovery component 217 via the respective control circuitry 222. Upon receiving the data, the recovery component 217 can provide the received data to the error correction component 215, which can perform an error correction data using the data received from the recovery component 217.

The error correction component 215 can return a result of the error correction operation back to the recovery component 217. If the result indicates that the error correction operation was successful (e.g., the quantity errors exceeding the threshold quantity is corrected), the recovery component 217 can resume the command components 213 that have been suspended while the recovery process is being performed and further provide, to the recovery management component 214, a notification that the recovery process is successfully complete.

In some embodiments, the error correction component 215 can further update the error correction data based on the data received (e.g., as part of a write request being performed at the error management component 206) from the recovery component 217.

Figure 3:
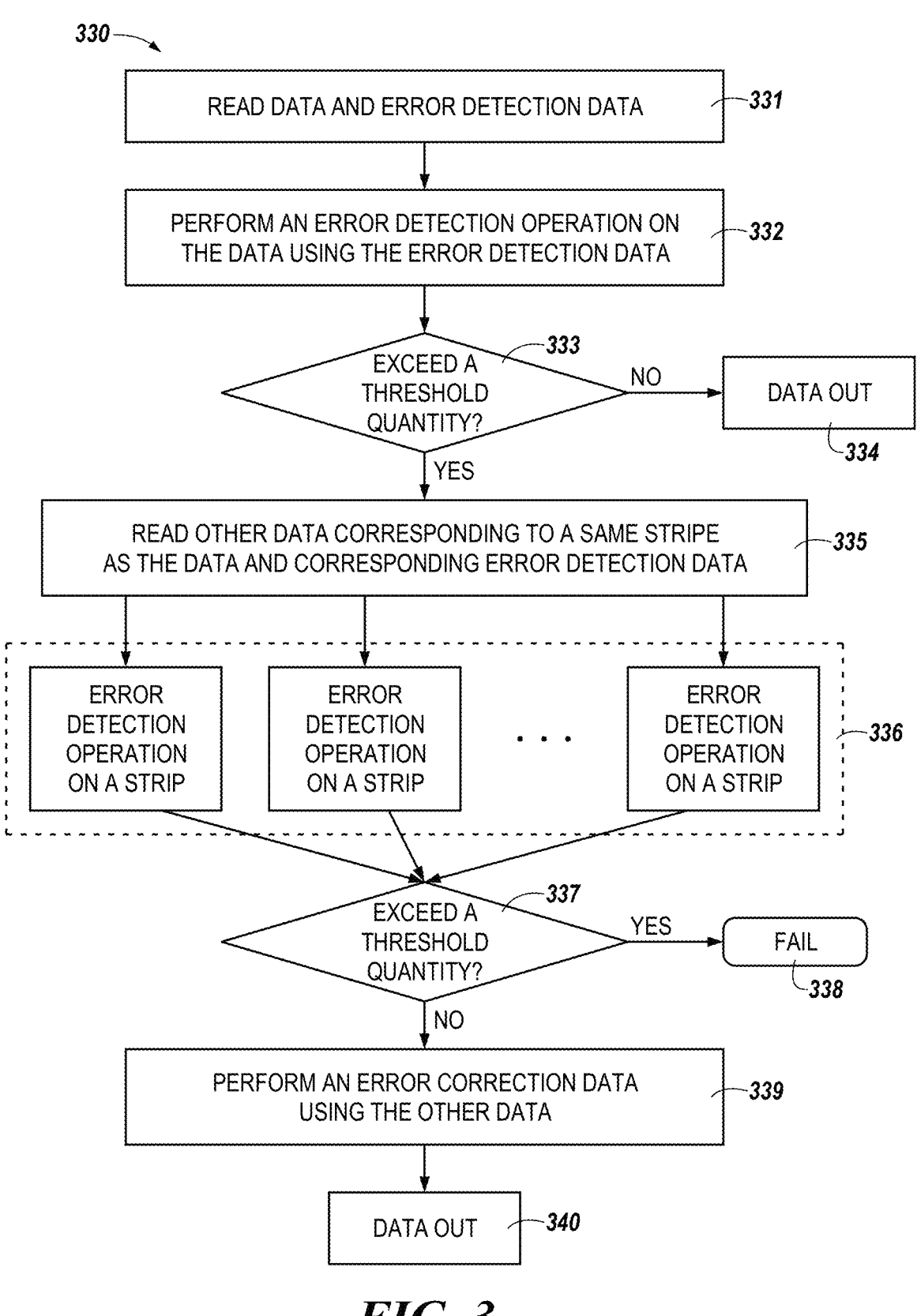
FIG. 3 is a flow diagram representing an example processing of a read request in accordance with a number of embodiments of the present disclosure.

FIG. 3 is a flow diagram 330 representing an example processing of a read request in accordance with a number of embodiments of the present disclosure. At block 331, data and corresponding error detection data are read from memory devices (e.g., memory devices 120 illustrated in FIG. 1) responsive to receiving (e.g., from the host 102 illustrated in FIG. 1) a read request to read the data. At block 332, an error detection operation is performed (e.g., at a respective one of the error detection components 210 illustrated in FIG. 2) on the data using the error detection data.

At block 333, a determination is made (e.g., at the error detection component 210) as to whether the error detection operation performed on the data indicates a quantity of errors exceeding a threshold quantity. If it is determined that the quantity of errors exceeds the threshold quantity, the flow diagram 330 proceeds to 335. Otherwise (e.g., if it is determined that the quantity of errors does not exceeds the threshold quantity), the flow diagram 330 proceeds to 334. At block 334, the data are transferred out to the host.

In some embodiments, when it is determined that the quantity of errors exceeds the threshold quantity at block 333, a read retry can be triggered to repeat the steps described in association with blocks 331, 332, and 333. If the steps performed as a part of the read retry still indicates the quantity of errors exceeds the threshold quantity, the flow diagram 330 proceeds to 335 (otherwise, to 334).

At block 335, other data corresponding to a same stripe as the data previously read are read (e.g., from the respective memory devices) along with their corresponding error detection data. At blocks 336, respective error detection operations are (e.g., concurrently) performed (e.g., at the respective error detection components 210) on each strip of data.

At block 337, a determination is made as to whether at least one of the error detection operations performed on the other data indicates a quantity of errors exceeding a threshold quantity. If it is determined that at least one of the error detection operations indicates the quantity of errors exceeding the threshold quantity, the flow diagram 330 proceeds to 338. At block 338, a notification of a read failure is sent out to the host. If it is determined that none of the error detection operations indicates the quantity of errors exceeding the threshold quantity, the flow diagram 330 proceeds to 339.

In some embodiments, when it is determined that at least one of the error detection operations indicates the quantity of errors exceeding the threshold quantity at block 337, a read retry can be triggered to repeat the steps described in association with blocks 335 and 336 on data indicated having the quantity of errors exceeding the threshold quantity. If the steps performed as a part of the read retry still indicates the quantity of errors exceeds the threshold quantity on the data, the flow diagram 330 proceeds to 338 (otherwise, to 339).

At block 339, an error correction operation is performed (e.g., at a respective one of the error correction components 215 illustrated in FIG. 2) on the data initially read from the memory devices using the other data as well as corresponding error correction data (e.g., corresponding to the data/other data). For example, the error correction operation can be performed by XORing the other data and the error correction data to recover the data requested by the read request.

Figure 4A:
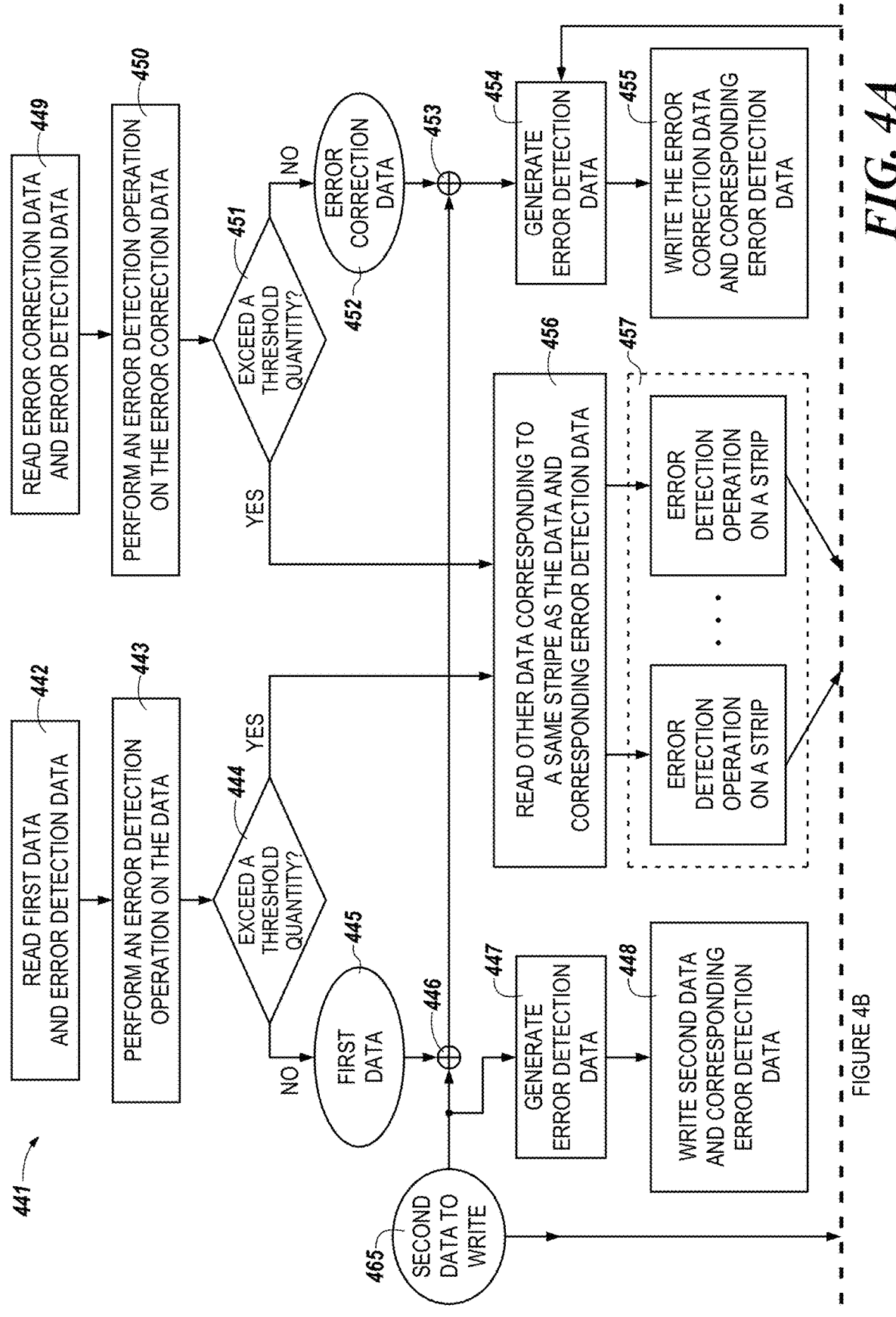
FIGS. 4A and 4B are a flow diagram representing an example processing of a write request in accordance with a number of embodiments of the present disclosure.
Figures 4A, 4B:
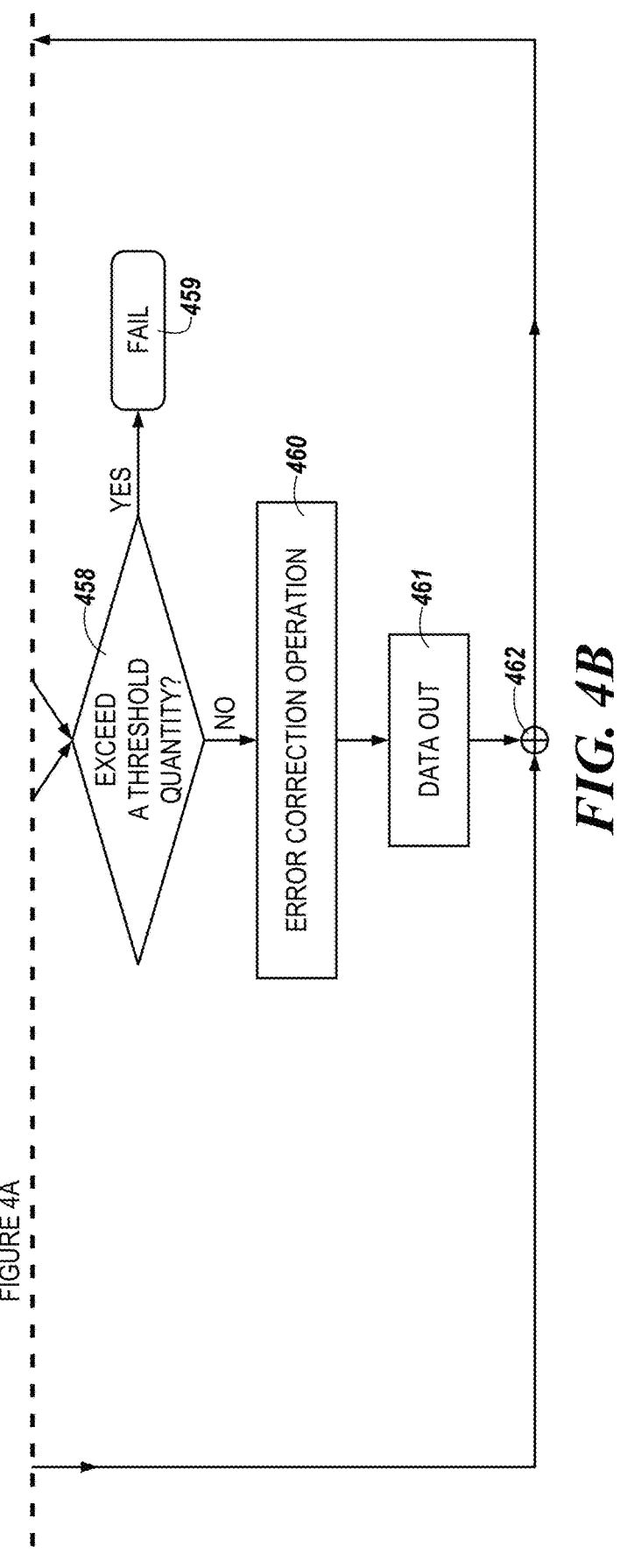

FIG. 4 is a flow diagram 441 representing an example processing of a write request in accordance with a number of embodiments of the present disclosure. At block 442, first data and its error detection data that are stored in a particular location of memory devices (e.g., memory devices 120 illustrated in FIG. 1) can be read responsive to receiving (e.g., from the host 102 illustrated in FIG. 1) a write request to write data to the particular location. Further, at block 449, error correction data (corresponding to the first data) and its error detection data can be also read from the memory devices and/or a cache (e.g., from the cache 107 illustrated in FIG. 1) responsive to the same request. At blocks 443 and 450, respective error detection operations are performed (e.g., at the respective error detection components 210 illustrated in FIG. 2) on the first data and the error correction data using respective error detection data.

At block 444, a determination is made as to whether the error detection operation performed on the first data indicates a quantity of errors exceeding a threshold quantity. If it is determined that the quantity of errors does not exceeds the threshold quantity, the flow diagram 441 proceeds to 445. At block 445, the first data are further transferred out (e.g., to the recovery component 217 illustrated in FIG. 2) for a comparison 446 with second data 465. For example, the comparison 446 includes an XOR (e.g., performed at a respective one of the error correction components 215 illustrated in FIG. 2) of the first data and the second data.

Further, at block 447, error detection data are generated (e.g., at the respective error detection component 210) based on the second data 465 and, at block 448, the second data and the generated error detection data are written back to the particular location. At block 451, a determination is made as to whether the error detection operation performed on the error correction data indicates a quantity of errors exceeding a threshold quantity. If it is determined that the quantity of errors does not exceeds the threshold quantity, the flow diagram 441 proceeds to 452. At block 452, the error correction data are further transferred out (e.g., to the recovery component 217) for a comparison 453 with a result of the comparison 446. For example, the comparison 453 an XOR (e.g., performed at a respective one of the error correction components 215) of the error correction data and the result of the comparison 446.

As a result of the comparison 453, the error correction data are updated (e.g., at a respective one of the error correction components 215) and become corresponding to the second data (such that the updated error correction data can be used to correct errors on the second data). At block 454, error detection data corresponding to the update error correction data are generated (e.g., at the respective error detection component 210) and, at block 455, the updated error correction data and the generated error detection data are written back to the memory devices.

If it is determined that the quantity of errors exceeds the threshold quantity at block 444 or block 451, the flow diagram 441 proceeds to 456. At block 456, other data corresponding to a same stripe as the first data are read (e.g., from the respective memory devices) along with their corresponding error detection data (e.g., from the cache).

At blocks 457, respective error detection operations are (e.g., concurrently) performed (e.g., at the respective error detection components 210) on each strip. At block 458, a determination is made as to whether at least one of the error detection operations performed on the other data indicates a quantity of errors exceeding a threshold quantity. If it is determined that at least one of the error detection operations indicates the quantity of errors exceeding the threshold quantity, the flow diagram 441 proceeds to 459. At block 459, a notification of a write failure is sent out to the host. If it is determined that none of the error detection operations indicates the quantity of errors exceeding the threshold quantity, the flow diagram 441 proceeds to 460.

In some embodiments, when it is determined that at least one of the error detection operations indicates the quantity of errors exceeding the threshold quantity at block 458, a read retry can be triggered to repeat the steps described in association with blocks 456 and 457 on data indicated having the quantity of errors exceeding the threshold quantity. If the steps performed as a part of the read retry still indicates the quantity of errors exceeds the threshold quantity on the data, the flow diagram 441 proceeds to 459 (otherwise, to 460).

At block 460, an error correction operation is performed (e.g., at a respective one of the error correction components 215) on the first data or the error correction data using the other data as well as the first data or the error correction data. For example, the error correction operation can be performed on the first data using the other data and the error correction data (e.g., an XOR of the other data and the error correction data to correct (e.g., recover) errors on the first data) or on the error correction data using the first data and the other data (e.g., an XOR of first data and the other data to regenerate the error correction data).

At block 461, the first data and/or the error correction data can be transferred out for a comparison 462 with the second data 465. The comparison 465 (e.g., performed at the respective error correction component 215) can correspond to the comparison 446 and/or 453. For example, the comparison 465 can involve a first comparison between the first data and the second data (e.g., an XOR of the first data and the second data) as well as a second comparison between the result of the first comparison and the error correction data (e.g., an XOR of the result of the first comparison and the error correction data). As described herein, the second comparison can update the error correction data to make it corresponding to the second data (such that the updated error correction data can be used to correct errors on the second data). Subsequent to the comparison 462, the flow diagram can proceed to 454 and then to 455 where steps described in association with blocks 454 and 455 can repeat.

FIG. 5 is a flow diagram representing an example method 570 for data stripe protection in accordance with a number of embodiments of the present disclosure. The method 570 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 570 is performed by the error management component 106 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 572, the data can be read from the group of memory devices responsive to receiving a read request of data corresponding to a stripe from a group of memory devices. Data read from each one of the group of memory devices in response to the read request can correspond to a respective one of strips of the stripe. each one of the group of memory devices can be configured to store error detection data for indication of a quantity of errors exceeding a threshold quantity on data stored in a respective one of the group of memory devices. At block 574, a respective error detection operation can be concurrently performed on the data read from each one of the group of memory devices using the error detection data stored in the respective one of the group of memory devices.

In some embodiments, responsive to at least one of the respective error detection operations indicating a quantity of errors exceeding the threshold quantity, the data corresponding to the stripe from the group of memory devices as well as the error detection data can be concurrently read from the respective one of the group of memory devices again. Further, a respective subsequent error detection operation can be concurrently performed on the data read from each one of the group of memory devices using the error detection data stored in the respective one of the group of memory devices. If at least one of the respective subsequent error detection operations indicates a quantity of errors exceeding the threshold quantity, error correction data corresponding to the stripe can be concurrently read from at least one of the group of memory devices and an error correction operation can be performed using the error correction data. If each one of the subsequent respective error detection operation indicates a quantity of errors not exceeding the threshold quantity, returning the data read from the group of memory devices to the host. At block 576, the data read from the group of memory devices can be returned to a host responsive to each one of the respective error detection operations indicating a quantity of errors not exceeding the threshold quantity.

FIG. 6 is another flow diagram representing another example method 680 for data stripe protection in accordance with a number of embodiments of the present disclosure. The method 680 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 680 is performed by the error management component 106 illustrated in FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 682, second data and first error detection data corresponding to the second data from the first memory device can be read responsive to receiving a write request to write first data to a first memory device of a group of memory devices. Further, at block 682, error correction data corresponding to the second data and second error detection data corresponding to the error correction data can be read from a second memory device of the group of memory devices.

At block 684, respective error detection operations can be concurrently performed on the second data using the first error detection data and on the error correction data using the second error detection data. In some embodiments, responsive to the respective error detection operation performed on the second data indicating a quantity of errors exceeding a threshold quantity, the error correction data can be updated by reading, from a remaining one of the group of memory devices, other data corresponding to a same stripe as the second data and performing an error correction operation on the second data using the other data and the error correction data. An XOR operation can be performed between the first data and the corrected second data to update the error correction data.

In some embodiments, responsive to the respective error detection operation performed on the error correction data read indicating a quantity of errors exceeding a threshold quantity, the error correction data can be updated by reading, from a remaining one of the group of memory devices, other data corresponding to a same stripe as the second data, performing an XOR operation among the other data and the second data corresponding to the write request to generate the updated error correction data, and replacing the error correction data stored in the second memory device with the updated error correction data.

At block 686, the error correction data can be updated responsive to each one of the respective error detection operations indicating a quantity of errors not exceeding a threshold quantity at least based in part on a comparison between the first data and the second data. At block 688, the second data to the first memory device and the updated error correction data can be written back to the second memory device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:

a group of memory devices; and a control component coupled to the group of memory devices, the control component comprising circuitry configured to, in response to receipt of a write request to write first data to a first memory device of the group of memory devices:

read second data that has been stored in the first memory device and error correction data;

perform respective error detection operations on the second data and the error correction data using error detection data read from the group of memory devices;

in response to the respective error detection operations performed on the second data and the error correction data not indicating a quantity of errors exceeding a threshold quantity, update the error correction data based on a comparison between the first data and the second data;

in response to at least one of the respective error detection operations performed on the second data and the error correction data indicating a quantity of errors exceeding the threshold quantity:

perform respective error detection operations on other data corresponding to a same stripe as the second data; and in response to at least one of the respective error detection operations indicating a quantity of errors exceeding the threshold quantity, perform a read retry to concurrently perform respective error detection operations again on the other data corresponding to the same strip of the stripe; and write, to the first memory device, the first data corresponding to the write request.

2. The system of claim 1, wherein the control component is further configured to:

responsive to the respective error detection operations concurrently performed on the other data not indicating a quantity of errors exceeding the threshold quantity, perform an error correction operation at least using the other data to recover the second data or the error correction data.

3. The system of claim 2, wherein the control component is further configured to:

update, subsequent to the second data or the error correction data being recovered, the error correction data based on a comparison between the first data and the second data.

4. The system of claim 2, wherein the control component is further configured to, in response to the respective error detection operations performed on the other data indicating a quantity of errors exceeding the threshold quantity:

send a notification of a write failure to a host.

5. The system of claim 1, wherein the control component is further configured to:

generate error detection data based on the updated error correction data; and write the updated error correction data and the generated error detection data to the group of memory devices.

6. A method, comprising:

reading, responsive to a write request to write first data to a first memory device of a group of memory devices, second data that has been stored in the first memory device and error correction data from the group of memory devices;

performing respective error detection operations on the second data and the error correction data using error detection data read from the group of memory devices;

responsive to the respective error detection operations performed on the second data and the error correction data not indicating a quantity of errors exceeding a threshold quantity, updating the error correction data based on a comparison between the first data and the second data;

responsive to at least one of the respective error detection operations performed on the second data and the error correction data indicating a quantity of errors exceeding the threshold quantity:

performing respective error detection operations on other data corresponding to a same stripe as the second data; and responsive to at least one of the respective error detection operations indicating a quantity of errors exceeding the threshold quantity, perform a read retry to concurrently perform respective error detection operations again on the other data corresponding to the same strip of the stripe; and writing, to the first memory device, the first data corresponding to the write request.

7. The method of claim 6, wherein updating the error correction data based on the comparison between the first data and the second data further comprises performing an XOR of the first data and the second data.

8. The method of claim 6, further comprising, responsive to the respective error detection operation performed on the second data indicating a quantity of errors exceeding the threshold quantity:

responsive to the respective error detection operations performed on the other data not indicating a quantity of errors exceeding the threshold quantity, performing an error correction operation using the other data and the error correction data to recover the second data.

9. The method of claim 8, wherein performing the error correction operation using the other data and the error correction data further comprises performing an XOR of the other data and the error correction data.

10. The method of claim 8, further comprising:

updating, subsequent to recovering the second data, the error correction data based on a comparison between the recovered second data and the first data.

11. The method of claim 6, further comprising, responsive to the respective error detection operation performed on the error correction data indicating a quantity of errors exceeding the threshold quantity:

responsive to the respective error detection operations performed on the other data not indicating a quantity of errors exceeding the threshold quantity, performing an error correction operation using the other data and the second data to recover the error correction data.

12. The method of claim 11, wherein performing the error correction operation using the other third data and the second data further comprises performing an XOR of the other data and the second data.

13. The method of claim 11, further comprising:

further updating, subsequent to recovering the error correction data, the recovered error correction data based on a comparison between the second data and the first data.

14. An apparatus, comprising:

a group of memory devices; and a control component coupled to the group of memory devices, the control component comprising circuitry configured to, in response to receipt of a read request of data corresponding to a first strip of a stripe:

read, from a first memory device of the group of memory devices, the data corresponding to the first strip;

perform an error detection operation on the data corresponding to the first strip;

in response to the error detection operation performed on the data corresponding to the first strip indicating a quantity of errors exceeding a threshold quantity, concurrently perform respective error detection operations on data corresponding to a second strip of the stripe and error correction data corresponding to the stripe.

15. The apparatus of claim 14, wherein the control component is configured to, in response to each one of the respective error detection operations not indicating a quantity of errors exceeding the threshold quantity:

perform, to recover the first data, an error correction operation using the data corresponding to the second strip and the error correction data.

16. The apparatus of claim 14, wherein the control component is configured to, in response to at least one of the respective error detection operations indicating a quantity of errors exceeding the threshold quantity:

send a notification of a read failure to a host.

17. The apparatus of claim 14, wherein the control component is configured to, in response to at least one of the respective error detection operations indicating a quantity of errors exceeding the threshold quantity:

perform a read retry to concurrently perform respective error detection operations again on the data corresponding to the second strip of the stripe and error correction data corresponding to the stripe.

18. The apparatus of claim 14, wherein the control component is configured to, in response to the error detection operation performed on the data corresponding to the first strip not indicating a quantity of errors exceeding a threshold quantity, send the data corresponding to the first strip to a host.

19. The apparatus of claim 14, wherein the error detection data comprises cyclic redundancy check (CRC) data.

20. The apparatus of claim 14, wherein the error correction data comprises parity data.

* * * * *